United States Patent [19]
Dehner

[11] 3,993,300
[45] Nov. 23, 1976

[54] AUTOMATIC FEEDER FOR COMPOSITE COPYING

[76] Inventor: Anton Hugo Dehner, Buchnerstrasse 34, CH 157 Dielsdorf, Zurich, Switzerland, 8050

[22] Filed: Aug. 20, 1975

[21] Appl. No.: 605,945

Related U.S. Application Data

[63] Continuation of Ser. No. 468,711, May 10, 1974, abandoned.

[52] U.S. Cl. ..................................... 271/4; 271/84; 271/131; 271/267
[51] Int. Cl.² ........................................... B65H 3/24
[58] Field of Search ............ 271/3, 4, 84, 131, 137, 271/138, 267, 269; 353/113

[56] References Cited
UNITED STATES PATENTS

| | | | |
|---|---|---|---|
| 2,549,898 | 4/1951 | Fish | 353/113 |
| 3,598,483 | 10/1971 | Galbraith, Jr. | 353/113 |
| 3,799,537 | 3/1974 | Cobb | 271/3 |

FOREIGN PATENTS OR APPLICATIONS

| 217,542 | 10/1941 | Switzerland | 353/113 |

*Primary Examiner*—Robert W. Saifer
*Attorney, Agent, or Firm*—James J. Ralabate; Clarence A. Green; William A. Henry, II

[57] ABSTRACT

An automatic feeder for serially feeding successive information bearing members from a supply magazine to a copying station for composite copying in combination with a master text and then from the copying station to a suitable repository, such as a receiving magazine comprises folded paths for guiding the information bearing members to and from the copying station and a reciprocating drive for alternately advancing the information bearing members in the two paths.

11 Claims, 3 Drawing Figures

3,993,300

AUTOMATIC FEEDER FOR COMPOSITE COPYING

This is a continuation of application Ser. No. 468,711, filed May 10, 1974, now abandoned.

BACKGROUND OF THE INVENTION

This invention relates to composite copying with copiers and duplicators (hereinafter collectively referred to as "copiers") and, more particularly, to means for automatically changing a predetermined portion of a composite copy.

There frequently is occassion for making composite copies. For example, there often is reason to send the same letter to several different addresses. One way to accomplish that is to print the basic text for the letter on one sheet and the address details for each of the different copies of the letter on separate sheets. The sheets bearing the address details can then be manually placed on the platen of a copier one after another for composite copying in combination with the basic text. That process is, however, time consuming. Alternatively, the address details for the several copies may be printed at spaced intervals on a web-like transparency. The transparency is then placed between the sheet bearing the basic text for the letter and the platen of the copier and provision is made for stepping the transparency across the platen to serially bring the different addresses into position for composite copying in combination with the basic text. Unfortunately, however, the transparency is expensive.

SUMMARY OF THE INVENTION

In accordance with the present invention, there is a feeder for automatically changing a predetermined portion of the input for a copier while the copier is in the process of making composite copies. Advantageously, the feeder may be embodied as an accessory for new or existing copiers.

More specifically, in keeping with this invention, the feeder includes means for serially transporting information bearing members from a storage magazine to a copying station overlying the platen of the copier and then from the copying station to another storage magazine. A reciprocating drive is used for the feeder so that the information bearing members are advanced toward and retracted from the copying station on alternate half cycles of the drive. Preferably, the information bearing members advancing toward the copying station are guided along an upper path while the information bearing members being retracted from the copying station are guided along a lower path.

BRIEF DESCRIPTION OF THE DRAWINGS

Other features and advantages of the invention will become apparent when the following detailed description is read in conjunction with the attached drawings, in which.

DETAILED DESCRIPTION OF THE ILLUSTRATED EMBODIMENT

While the invention will be described in some detail hereinbelow with reference to a specific embodiment, it is to be understood that there is no intent to limit it to that embodiment. On the contrary, the intent is to cover all modifications, alternatives and equivalents falling within the spirit and scope of the invention as defined by the appended claims.

Figure 3:
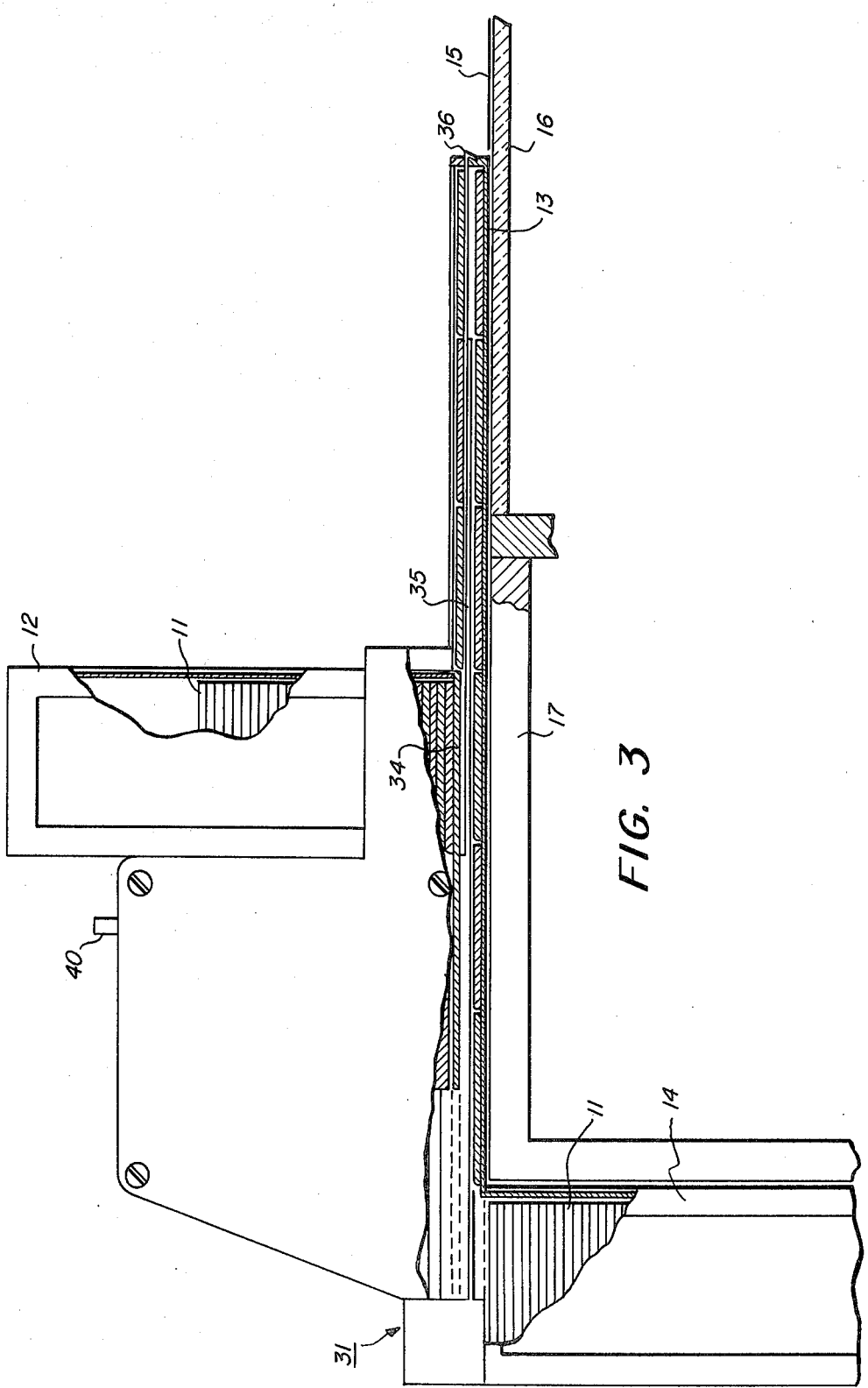
FIG. 3 is a side elevation, partly cut away and partly in section, of the feeder shown in FIG. 1 in position on a copier.

Turning now to the drawings, it will be seen that there is a feeder constructed in accordance with this invention for serially feeding successive information bearing members 11 from a supply magazine 12 to a copying station 13 and then to a suitably repository, such as a receiving magazine 14. In practice, as best shown in FIG. 3, the feeder is positioned so that the copying station 13 overlies the transparent platen 16 of, say, an electrostatic copier 17. Furthermore, the information bearing members 11 are initially stacked image side down in the supply magazine 12. Accordingly, each of them is appropriately oriented upon reaching the copying station 13 for composite copying in combination with a pre-positioned master document 15 on an adjacent portion of the platen 16.

Figure 1:
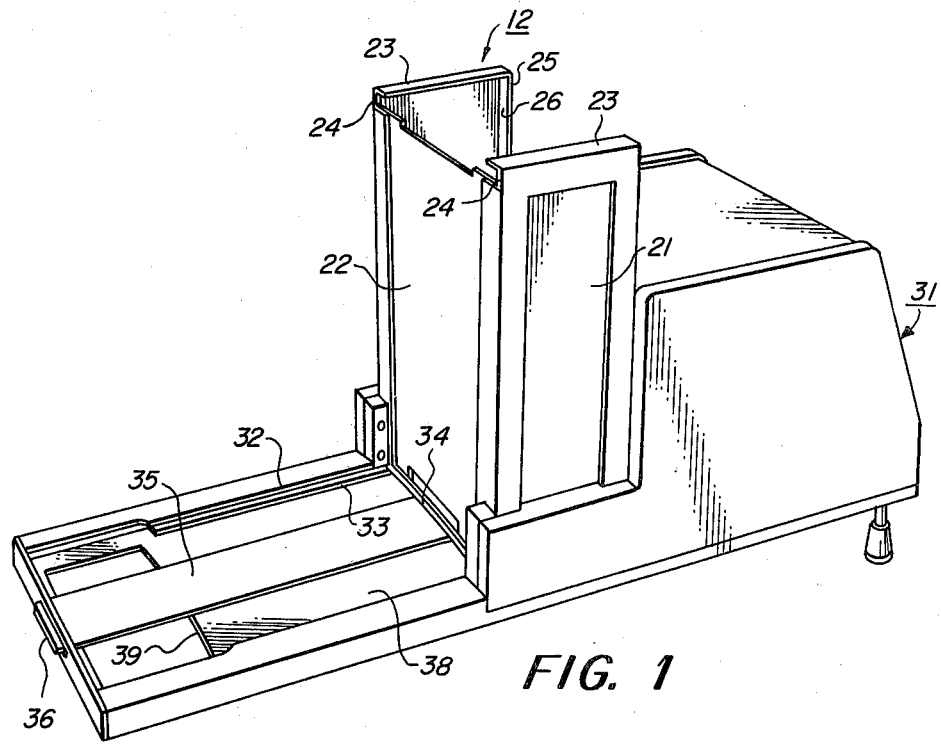
FIG. 1 is a perspective view of a feeder embodying the present invention.
Figure 2:
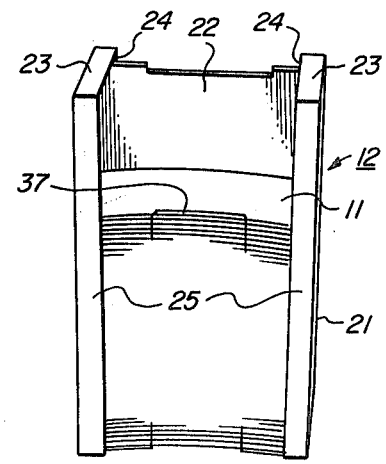
FIG. 2 is a perspective view of a magazine for storing the information bearing members.

For illustrative purposes, it has been assumed that the platen 16 is curved and, therefore, the information bearing members 11 are shown (FIG. 2) as having a complementarily curved configuration so that each of them fits into close parallel relationship with the platen 16 while at the copying station 13. It will, however, be understood that the feeder may be readily modified for use with copiers having flat platens. Additionally, the feeder is shown as being an accessory removably seated on top of the copier 17, but it will be apparent that a more permanent installation may be used if desired.

In the illustrated embodiment, the information bearing members 11 are guided toward and away from the copying station 13 along separate, generally horizontal paths which are folded one over the other. The upper path is aligned with a gap 24 at the bottom of supply magazine 12 and is defined by a pair of parallel ways or grooves 32 (only one can be seen) which extend from the supply magazine 12 to the copying station 13. The lower path, on the other hand, is aligned with a gap 24 at the top of the receiving magazine 14 and is defined by another pair of parallel ways or grooves 33 (one is referenced although it is hidden) and a thin base plate 38. The two paths are somewhat widened at the copying station 13 so that the information bearing members 11 sequentially gravity fed from the upper path, through an aperture 39 in the base plate 38, onto the platen 15 as their predecessors are removed from the copying station 13.

To move the information bearing members 11 toward and away from the copying station 13, there is a reciprocating drive mechanism 31 positioned rearwardly of the supply magazine 12. The drive mechanism 31 has a pair of motion transmitting members, formed from, say, a split plunger or the like, for advancing the information bearing members 11 in the upper and lower paths toward the copying station 13 and the receiving magazine 14, respectively, on alternate half cycles. Specifically, an upper portion 34 of the plunger is aligned with the upper sets of grooves 32 and positioned so that a new information bearing member 11 is pushed out through the gap 24 at the bottom of the supply magazine 12 to enter the upper path on each forward stroke of the plunger. A lower portion 35 of the plunger extends forwardly in a free space between the information bearing members 11 in the upper and lower paths and is positioned so that a downwardly extending portion 35 of the plunger is bent downwardly and carries a resilient claw 36 at its outer end engages the front edge of any information bearing member 11 at the copying station 13 as the plunger starts into its rearward stroke. Hence, the information bearing members 11 in the lower path are pulled toward the receiving magazine 14 on the rearward strokes of the plunger.

Suitably, the plunger 35 is selected to have a stroke length equal to the front-to-back dimension of the information bearing members 11, and the lengths of the upper and lower paths are selected to be integer multiples of that dimension. To reciprocatingly drive the plunger, the drive mechanism 31 typically includes a spring (not shown) for biasing the plunger toward the forward extreme of its stroke which draws the plunger rearwardly when it is energized and a solenoid (also not shown) which is energized to draw the plunger rearwardly against the spring bias toward the rearward extreme of its stroke. In that event, the plunger will reciprocate as the solenoid is alternately energized and de-energized.

In keeping with one of the more detailed aspects of this invention, the supply magazine 12 and the receiving magazine 14 are interchangable. To that end, they are removably mounted on the feeder and have substantially identical constructions. Specifically, as shown, each of the magazines 12 and 14 comprises a sidewall 22 secured to the forward edges of a pair of opposed end walls 21. The rearward edges of the two end walls 21 are bent inwardly toward each other to provide a pair of full length ledges or stops 25 for retaining any information bearing members 11 stored in the magazine, and the interior surfaces of the stops 25 are coated with a resilient material 26 to bias the stored members 11 toward the sidewall 22. Furthermore, the top and bottom edges of the two end walls are also bent inwardly toward each other. Therefore, regardless of whether the magazine is right side up or upside down, there are a pair of shoulders 23 for supporting the stored information members 11. Additionally there are gaps 24 at the top and the bottom of the sidewall 22 of each magazine, and each of those gaps 24 is of sufficient height and width to allow a single information bearing member 11 to pass into or out of the magazine at a time.

Some rigidity is required of the information bearing members 11 because they are expected to efficiently transfer motion to each other. For that reason, each of them typically comprises a molded, transparent plate bearing removably printing, such as an adhesively backed address label. A beveled surface 37 along the rearward edge of each of the information bearing members 11 simplifies the requirements for the drive mechanism 31. Specifically, during the forward stroke of the plunger, the beveled edge 37 of the information bearing member 11 at the copying station 13 serves as a camming surface for lifting the claw 36 on the lower portion 35 of the plunger over the information bearing member 11 at the copying station 13, thereby permitting the plunger to continue to the forward extreme of its stroke without impediment.

In operation, a fully loaded supply magazine 12 and an empty receiving magazine 14 are fitted into place on the feeder, and the solenoid for the drive mechanism 31 is coupled to the control circuit (not shown) of the copier 17 so that the solenoid is energized once per copier cycle. For example, the connections may be selected so that the solenoid is energized on each return scan of the copier 17. After that has been accomplished, a push bottom switch 40 on top of the feeder is manually operated several times (four times as shown) so that the solenoid is alternately energized and de-energized a corresponding number of times, thereby causing the upper portion 34 of the plunger to advance the first information bearing member 11 to the copying station 13.

At that point, the copier 17 may be actuated for a run of any number of single copies up to the total number of information bearing members 11 available. During the course of the copy run, the information bearing members 11 are automatically advanced from the supply magazine 12 to the copying station 13 and then to the receiving magazine 14. Advantageously, there is a concertina spring or the like (not shown) in the receiving magazine 14 to prevent the information bearing members 11 from skewing or otherwise misaligning as they are deposited therein. After the original supply of information bearing members 11 has been exhausted, the few remaining in the lower path may be manually pulled toward the receiving magazine 14 by a flat hand tool (not shown). Then, the process may be repeated with another supply magazine 12 and another receiving magazine 14.

CONCLUSION

In view of the foregoing, it will now be understood that a relatively simple and reliable automatic feeder is provided in accordance with this invention for serially feeding successive information members to a copying station for copying in combination with the text of a pre-positioned master. As will be appreciated, the feeder may be permanently installed on the copier, but the flexibility of the copier is increased by embodying the feeder as a removable accessory.

What is claimed is:

1. In a copying machine having a platen for copying information bearing members including a feeder for serially feeding successively said information bearing members image side down to a copying station, said feeder having first and second paths folded relative to one another for guiding the information bearing members toward and away from said copying station in a non-interferring manner, the improvement comprising:
   a reciprocable drive means for said feeder having a first motion transmitting member aligned with said first path and a second motion transmitting member aligned with said second path whereby as the drive means is moved in a first direction information bearing members in the first path are driven toward the copying station and as the drive means moves in a second direction information bearing members in the second path are moved away from the copying station, said second motion transmitting member having means to reduce impediment to its travel in the first direction caused by the presence of information bearing members in the second path as it is moved in said first direction.

2. The improvement of claim 1 wherein said second motion transmitting member includes an extending resilient member which engages the edge of any information bearing member at said copying station during the movement of the drive means in the second direction and pulls the information bearing member away from the copying station.

3. The improvement in claim 2 wherein the means to freely move said second motion transmitting member in the first direction against the impediment of an information bearing member in its path includes means to deform the resilient member away from the information bearing member in said second path as the second motion transmitting member is moved in the first direction.

4. The improvement of claim 1 including a supply means and a repository means for storing said information bearing members, said supply means being located adjacent and above said copying station and having an exit aligned with said first path for serially dispensing said information bearing members image side down, said repository means having an entrance aligned with said second path for serially receiving said information bearing members image side down.

5. The improvement of claim 4 wherein said information bearing members are placed on the copying station and deposited in the repository means by gravity feeding.

6. The improvement of claim 4 wherein said supply means and said repository means are interchangeable and removably mounted on said feeder.

7. The improvement of claim 1 wherein said feeder is removably mounted on said copying machine with said copying station overlapping a portion of said platen.

8. The improvement of claim 1 wherein said first and second motion transmitting members are adapted to move together.

9. The improvement of claim 1 wherein said information bearing members have rigid bodies and a rearward edge which is the leading edge of the information bearing member as it moves in the second path, said rearward edge being beveled and slanted towards the center of the information bearing members from the bottom to the top thereof and adapted to cam said second motion transmitting member during the forward motion of said reciprocable drive means, thereby permitting unimpeded continuation of the forward motion.

10. In a copying machine having a platen for copying information bearing members including a feeder for serially feeding successively said information bearing members image side down to a copying station, said feeder having first and second paths folded relative to one another for guiding the information bearing members toward and away from said copying station in a non-interferring manner, the improvement comprising:
a reciprocable drive means for said feeder having a first motion transmitting member aligned with said first path and a second motion transmitting member aigned with said second path whereby as the drive means is moved a first direction information bearing members in the first path are driven toward the copying station and as the drive means moves in a second direction information bearing members in the second path are moved away from the copying station, said second motion transmitting member having a beveled edge adapted to cam said second motion transmitting member during the forward motion of said reciprocable drive means whereby interference of said information bearing members is reduced.

11. The improvement of claim 10 wherein said information bearing members have beveled edges adapted to compliment the beveled edge of said second motion transmitting member wherein said second motion transmitting member is moved by the forward motion of said reciprocable drive means in a non-interferring manner.

* * * * *